United States Patent [19]

Charng

[11] Patent Number: 5,335,393
[45] Date of Patent: Aug. 9, 1994

[54] DUAL-BLADE WINDSHIELD-WIPER ASSEMBLY

[75] Inventor: Cedric S. K. Charng, Taipei, Taiwan

[73] Assignee: China Wiper Special Rubber Co. Ltd., Taipei, Taiwan

[21] Appl. No.: 784,236

[22] Filed: Oct. 31, 1991

Related U.S. Application Data

[63] Continuation-in-part of Ser. No. 543,136, Jun. 22, 1990.

[30] Foreign Application Priority Data

Jan. 22, 1990 [GB] United Kingdom ............... 9001392.1

[51] Int. Cl.$^5$ ............................................. B60S 1/38
[52] U.S. Cl. .............................. 15/250.41; 15/250.42
[58] Field of Search ........... 15/250.41, 250.40, 250.42, 15/250.36, 250.35, 250.31, 250.09

[56] References Cited

U.S. PATENT DOCUMENTS

| | | | |
|---|---|---|---|
| 3,846,864 | 11/1974 | Baut et al. | 15/250.42 |
| 4,339,839 | 7/1982 | Knights | 15/250.41 |
| 4,360,941 | 11/1982 | Mabie | 15/250.42 |
| 4,683,606 | 8/1987 | Sharp | 15/250.42 |
| 4,794,664 | 1/1989 | Arai | 15/250.42 |
| 4,852,206 | 8/1989 | Fisher | 15/250.42 |

FOREIGN PATENT DOCUMENTS

| | | | |
|---|---|---|---|
| 0232598 | 8/1987 | European Pat. Off. | 15/250.41 |
| 0327233 | 8/1989 | European Pat. Off. | 15/250.41 |
| 2933363 | 3/1981 | Fed. Rep. of Germany | 15/250.41 |
| 3004478 | 8/1981 | Fed. Rep. of Germany | 15/250.41 |
| 1366498 | 6/1964 | France | 15/250.41 |

*Primary Examiner*—Timothy F. Simone
*Assistant Examiner*—Gary K. Graham
*Attorney, Agent, or Firm*—Herbert Dubno; Andrew Wilford

[57] ABSTRACT

A dual wiper blade assembly for mounting on the end of a wiper arm and engaging a windshield has an elongated main yoke generally pivoted at a transverse central pivot on the wiper arm and having a pair of outer ends spaced longitudinally outward from the pivot, respective one-piece secondary yokes pivoted at outer axes on the outer ends of the main yoke and having inner and outer ends, and respective inner and outer mounts on the secondary-yoke ends for carrying a pair of parallel and transversely spaced wiper blades engageable against a windshield.

8 Claims, 3 Drawing Sheets

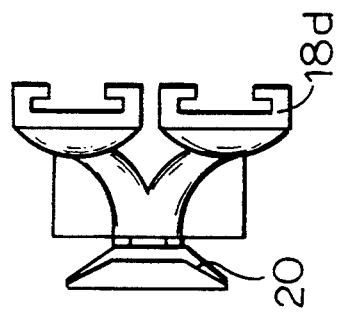
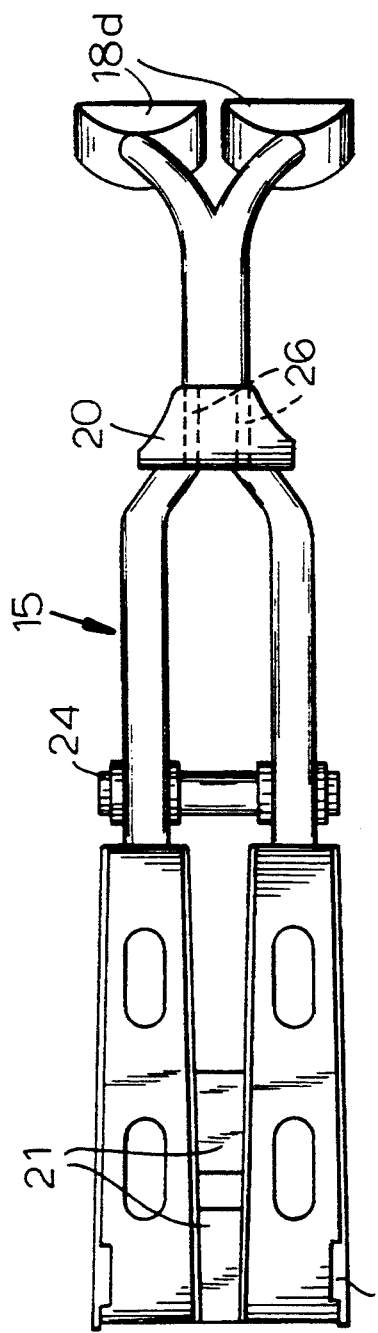
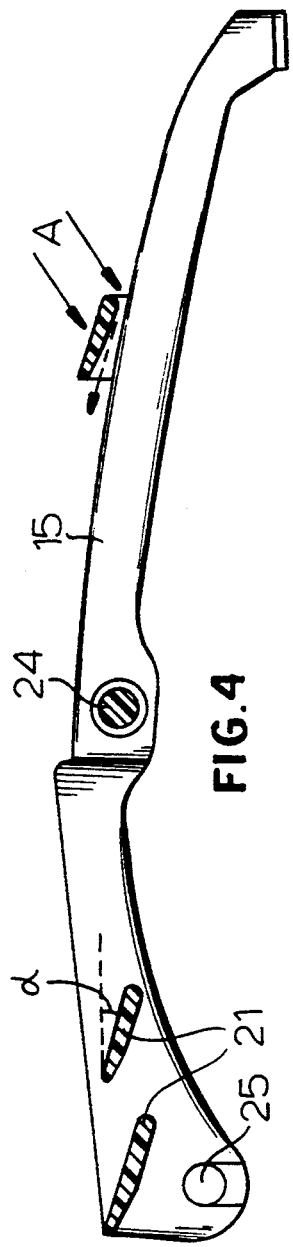
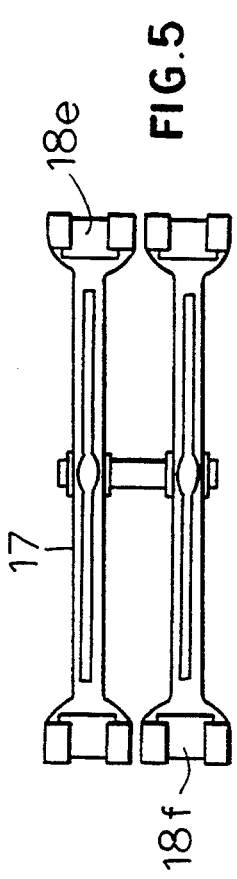

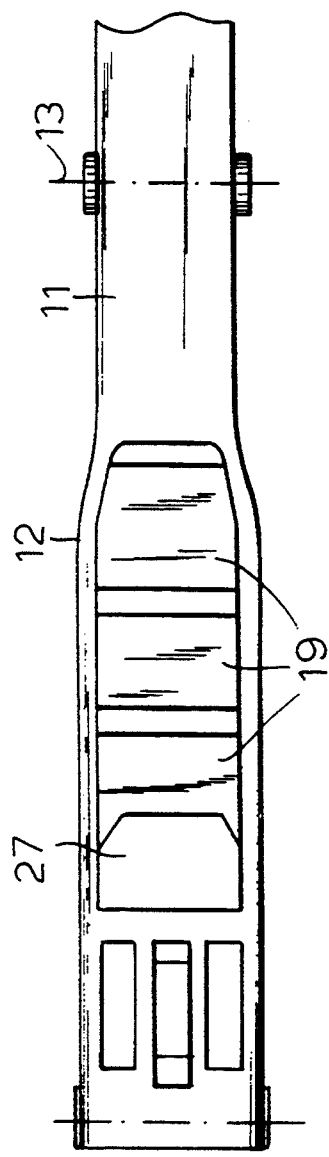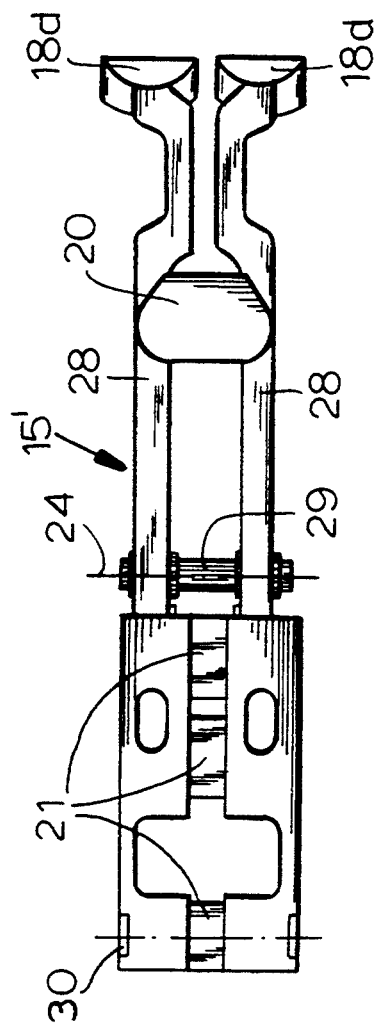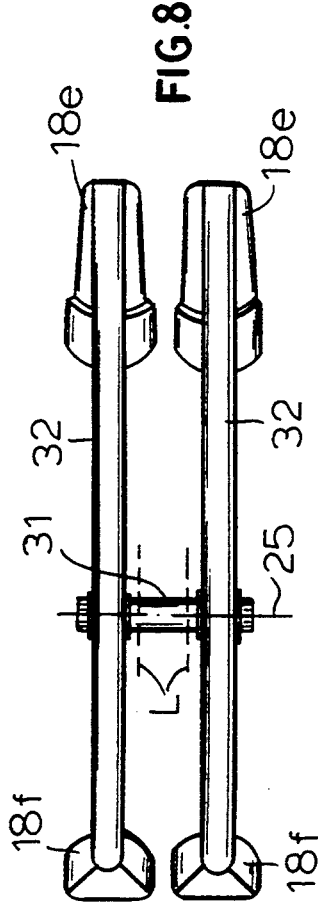

DUAL-BLADE WINDSHIELD-WIPER ASSEMBLY

CROSS REFERENCE TO RELATED APPLICATION

This application is a continuation-in-part of my co-pending patent application 07/543,136 filed Jun. 22, 1990.

FIELD OF THE INVENTION

The present invention relates to a windshield-wiper assembly. More particularly this invention concerns such an assembly that holds two separate wiper blades.

BACKGROUND OF THE INVENTION

A standard windshield wiper is comprised of a wiper arm normally pivoted at a lower end at the base of the windshield about an axis perpendicular to the longitudinal axis of the wiper arm and an upper end on which a blade assembly is pivoted about an axis perpendicular to a plane including the lower-end pivot axis and wiper-arm longitudinal axis. The assembly itself comprises a main yoke pivoted on the upper end of the wiper arm and normally extending generally parallel to the wiper arm. Upper and lower secondary yokes are pivoted to upper and lower ends of the main yoke and tertiary yokes are frequently pivoted on the upper end of the upper secondary yoke and on the lower end of the lower secondary yoke. In particularly long setups, tertiary yokes may also be provided on the lower and upper ends of the upper and lower secondary yokes, respectively. It should be noted that the terms "upper" and of "lower" are here used relatively only and refer to being distal or proximal, respectively, from the axis at which the wiper arm is pivoted on the vehicle. The ends of the tertiary yokes, and any secondary yoke end to which a tertiary yoke is not pivoted, are formed as claws that engage around a backing strip that in turn carries an elastomeric wiper blade. The main yoke may carry two such pairs of secondary yokes carrying respective tertiary yokes for carrying two such backing strips and blades.

A problem at high vehicle speed is that the air moving over the windshield can in effect get under the wiper blade assembly and lift it from the windshield, reducing the wiping effect. Accordingly it is known, for example from German patent document 3,004,478 to incorporate one or more air deflector members in the central main yoke of the blade assembly so that as the velocity of the moving air stream increases, the force with which the assembly is pressed down on the windscreen is also increased. However, this known method does not take account of the likely variation in pressures generated on the wiper blade by the secondary and/or tertiary yokes and although some overall improvement can be expected by the use of air deflector members on the main yoke, such use has not, thus far, solved the problem of securing good end-to-end wiping performance on a range of different windshield profiles over a range of different moving air stream configurations.

OBJECTS OF THE INVENTION

It is therefore an object of the present invention to provide an improved dual wiper blade assembly.

Another object is the provision of such an improved dual wiper blade assembly which overcomes the above-given disadvantages, that is which ensures good end-to-end wiping characteristics even at very high speeds.

A further object is to advance principles laid out in the above-cited parent application.

SUMMARY OF THE INVENTION

A dual wiper blade assembly for mounting on the end of a wiper arm and engaging a windshield according to the invention has an elongated main yoke generally pivoted at a transverse central pivot on the wiper arm and having a pair of outer ends spaced longitudinally outward from the pivot, respective one-piece secondary yokes pivoted at outer axes on the outer ends of the main yoke and having inner and outer ends, and respective inner and outer mounting means on the secondary-yoke ends for carrying a pair of parallel and transversely spaced backing strips each carrying a respective wiper blade engageable against a windshield.

This structure is extremely durable, yet in use the two blades are solidly held against the windshield. The one-piece unitary construction of the secondary yokes provides considerable advantages in strength while still allowing the blades to follow the curve of the windshield accurately.

According to further features of the invention each secondary yoke is formed by a pair of transversely spaced longitudinal bars and at least one transverse bridge element unitary with and interconnecting the longitudinal bars. Each inner mount typically includes a respective claw formed on the inner end of the respective bar and the outer mount typically comprises a tertiary yoke or yokes pivoted at the outer ends of the bars and formed with blade-holding claws.

Each tertiary yoke according to this invention has an outer end formed with two such blade-holding claws and an inner end also formed with two such blade-holding claws. Furthermore each tertiary yoke has a pair of parallel bars having inner and outer ends provided with the respective claws and a pivot pin transversely interconnecting the respective tertiary-yoke bars and pivoted on the respective secondary-yoke outer end. The bars and pin of each tertiary yoke are unitary.

The inner and outer mounting means form claw pairs spaced apart longitudinally along the length of the wiper-blade assembly. The two claws of each claw pair are transversely spaced apart from each other. The various yokes are preferably made of a plastics material the natural resilience of which ensures that the two spaced claws of each claw pair are not rigid with each other but are able to move relative to each other.

DESCRIPTION OF THE DRAWING

The above and other objects, features, and advantages will become more readily apparent from the following, reference being made to the accompanying drawing in which:

FIG. 2 is a top view of a secondary yoke in accordance with the invention;

FIG. 3 is an end view of the secondary yoke of FIG. 2;

FIG. 4 is a longitudinal section through the yoke of FIG. 2;

FIG. 5 is a top view of a tertiary yoke in accordance with the invention; and

FIGS. 6, 7, and 8 are top views of further primary, secondary, and tertiary yokes according to the invention.

SPECIFIC DESCRIPTION

Figure 1:
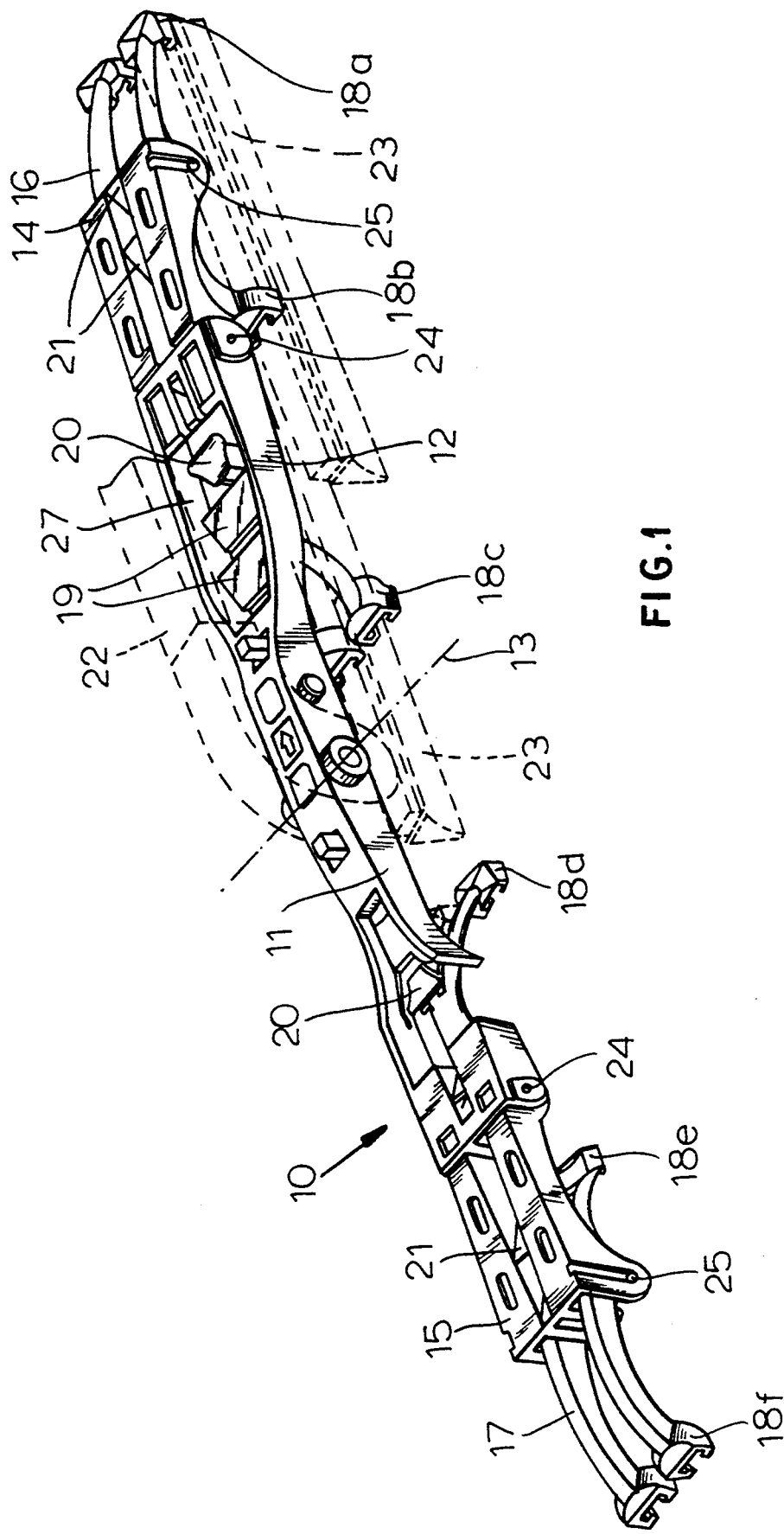
FIG. 1 is a partly broken-away perspective view of a wiper-blade assembly according to this invention.

As seen in FIG. 1, a blade assembly 10 is carried on a wiper arm indicated in dashed lines at 22 and carries wiper blades indicated similarly in dashed lines at 23. This assembly 10 is pivoted to a central region 11 of a central main or primary yoke 12 to the wiper arm 22. The actual linkage does not constitute a part of this invention and accordingly can be of any suitable conventional design. It allows relative pivoting of the assembly 10 on the arm 22 about an axis 13 transverse to both the arm 22 and assembly 10.

Attached at transverse inner pivots 24 to the main yoke 12 are lower and upper secondary yokes 14 and 15 (see FIGS. 2–4) and pivotally attached at outer pivots 25 parallel to the pivots 24 to the lower and upper ends of the secondary yokes 14 and 15 are respective lower and upper tertiary yokes 16 and 17 (see FIG. 5). The yokes 14 through 17 form six pairs of wiper attachment claws 18a, 18b, 18c, 18d, 18e, and 18f each capable of gripping a supporting backing strip of one of two identical wiper blades 23. Each claw, of each pair of claws, has two projections extending therefrom which define a channel for reception of one of the backing strips of one of the wiper blades. The design and mode of operation of the claws 18a–f to support blades 23 mounted in a backing strip will not be further discussed since they can also be conventional and these features are not central to the present invention. The two outermost claws 18a and 18f engage the channel member of the respective wiper blade 23 adjacent its lower and upper ends so that the other four claws 18 engage the wiper support member at roughly 20%, 40%, 60% and 80% along its length.

To utilize the air flows that move past the assembly 10 in normal use to advantage, each secondary yoke 14 and 15 has an elevated wing member or vane 20 mounted to the inner side, that is its side toward the central pivot 13, of its central pivot 24 and a pair of angled air deflectors 21 located to the outer side of the pivot 24 of the secondary yoke 14 and 15, that is away from the main yoke 12. The vanes 20 are supported on small fins 26 on the yokes 14 and 15 in line with respective apertures 27 (see also FIG. 6) formed in the main yoke 12 and the vanes 21 bridge the sides of the yoke 14 or 15. Similarly, the main yoke 12 is provided with wind-deflecting vanes 19 angled the same as the vanes 20 and 21, that is with inner edges closer to the windshield than outer edges. In this way the reaction caused by the air on the wing members and air deflectors of the secondary yokes generates a force which modifies how the wiper blades are urged against the windshield.

As shown in the drawings, each wing member 20 and 21 acts to increase the force exerted by the adjacent claw on the respective wiper blade but this is not necessarily the best arrangement and it is not ruled out that an airfoil shape leading to a reduced pressure with increasing air speed may be desirable at some location in some circumstances. In this application each vane 20 or 21 is tipped at an angle $a$ of 15° to the longitudinal axis of the assembly 10, with an inner edge, that is an edge closer to the central crosswise axis 13, that is closer to the windshield than an outer edge. As a result the air flowing in the direction indicated by arrows A in FIG. 4 will serve to press the ends of the yokes 14 and 15 down on the windshield. It will be appreciated that the air flow conditions in use are complex and will involve air flows which deflect off the windshield and air flows which "slip" over the windshield.

Although not shown, one or more further wing members and/or air deflectors may be mounted on each tertiary yoke 16 and 17 to further enhance the aerodynamic effect.

As can be seen from the drawings there are a number of novel design features associated with the wiper blade assembly described herein. For example the main yoke portion 12 is designed so that the elevated wing members 20 are received between unobstructed spaced apart side walls of the main yoke 12. Thus in use air is able to flow between these spaced apart walls and to act directly on the wing members 20. Each secondary yoke 14 and 15 is of generally bifurcated form, the bifurcations thereof being joined by the air deflectors 21. If an elevated wing member is provided on each tertiary yoke it can be located in use between these bifurcations. Since there are no connecting webs between the bifurcations to obstruct air flows, any air flowing between them is able to act directly on the wing member.

As seen in FIG. 6 with respect to another secondary yoke 15', same is formed by two longitudinally extending bars 28 bridged by the vane 20, the vanes 21 (here three of them), and by a pin 29 forming the pivot axis 24 all unitarily formed of a durable synthetic resin. Thus the only structure interconnecting the two bars 28 is constituted by the vanes 20 and 21 and the pin 29. The inner end of the secondary yoke 15' is formed with the two claws 18d and the outer end with jaws 30 for a pin 31 forming the axis 25. This pin 31, like the pin 29, is unitary with two bars 32 that carry the claws 18e and 18f. It is possible to make the pin 31 of separate sections joined pivotally together at the lines L for pivoting of the two bars 32 independently of each other.

I claim:

1. A dual wiper blade assembly for mounting on an end of a wiper arm to engage a windshield, the assembly comprising:

an elongate main yoke generally pivotable at a transverse central pivot on the wiper arm and having a pair of outer ends spaced longitudinally outward from the pivot;

respective one-piece elongated secondary yokes pivoted at outer axes on the outer ends of the main yoke and having inner and outer ends;

a pair of separate and laterally spaced elongated backing strips each carrying a respective wiper blade; and a pair of laterally spaced and separated claws on each of the inner and outer secondary-yoke ends each claw, of each pair of claws, having two projections defining a channel in which a respective backing strip is received, each claw of each pair of claws gripping the respective backing strips and holding same parallel to each other and spaced transversely of the yokes with each wiper blade engageable against the windshield.

2. The dual wiper blade assembly defined in claim 1 wherein each secondary yoke is formed by a pair of transversely spaced longitudinal bars, said bars having inner and outer ends; and at least one transverse bridge element unitary with and interconnecting the respective bars.

3. The dual wiper blade assembly defined in claim 2 wherein a respective such separate claw is formed on the inner end of each bar of the respective pair of transversely spaced longitudinal bars, the claws being engaged around the respective backing strips.

4. The dual wiper blade assembly defined in claim 3, further comprising a respective tertiary yoke pivoted at the outer ends of the bars and itself formed with two such outer pairs of blade-holding claws engaged around the respective backing strips.

5. The dual wiper blade assembly defined in claim 4 wherein each tertiary yoke has an outer end formed with two such blade-holding claws and an inner end also formed with two such blade-holding claws.

6. The dual wiper blade assembly defined in claim 5 wherein the tertiary yokes each include a pair of parallel bars having inner and outer ends provided with the respective claws; and a pivot pin transversely interconnecting the respective tertiary-yoke bars and pivoted on the respective secondary-yoke outer end.

7. The dual wiper blade assembly defined in claim 6 wherein the bars and pin of each tertiary yoke are unitary.

8. A dual wiper blade assembly for mounting on an end of a wiper arm to engage a windshield, the assembly comprising:

an elongated main yoke generally pivotable at a transverse central pivot on the wiper arm and having a pair of outer ends spaced longitudinally outward from the pivot;

a pair of laterally spaced and separate elongated backing strips each carrying a respective wiper blade;

respective one-piece elongated secondary yokes pivoted at outer axes on the outer ends of the main yoke and having inner and outer ends, the inner ends each formed with a pair of laterally spaced and separate blade-holding claws; and respective tertiary yokes pivoted at the outer ends of the secondary yokes and each tertiary yoke formed with a pair of laterally spaced and separate blade-holding claws, each claw, of each pair of claws on both the secondary and tertiary yokes, having two projections defining a channel in which a respective backing strip is received.

* * * * *